(12) United States Patent
Chen

(10) Patent No.: US 6,661,408 B2
(45) Date of Patent: Dec. 9, 2003

(54) TOUCH SCREEN CAPABLE OF ISOLATING NOISE SIGNALS

(75) Inventor: Chi-Ruey Chen, Chung-Ho (TW)

(73) Assignee: Eturbotouch Technology Inc., Taipei (TW)

( * ) Notice: Subject to any disclaimer, the term of this patent is extended or adjusted under 35 U.S.C. 154(b) by 200 days.

(21) Appl. No.: 09/814,842

(22) Filed: Mar. 23, 2001

(65) Prior Publication Data

US 2002/0135568 A1 Sep. 26, 2002

(51) Int. Cl.[7] .................................................. G09G 5/00
(52) U.S. Cl. ...................... 345/173; 345/174; 345/178; 178/18.01; 178/18.02; 178/18.03; 178/18.05; 178/18.06; 178/18.07; 341/5; 341/24; 174/32; 174/35 R; 174/35 CE; 174/138 A
(58) Field of Search .................................. 345/173–178; 178/18.01–18.03, 18.05–18.08, 20.01, 20.02; 341/5, 24; 174/32, 35 R, 35 CE, 138 A

(56) References Cited

U.S. PATENT DOCUMENTS

| | | | | |
|---|---|---|---|---|
| 4,293,734 A | * | 10/1981 | Pepper, Jr. | 178/18.01 |
| 4,695,827 A | * | 9/1987 | Beining et al. | 341/31 |
| 4,822,957 A | * | 4/1989 | Talmage et al. | 178/18.05 |
| 6,081,259 A | * | 6/2000 | Teterwak | 345/173 |
| 6,278,444 B1 | * | 8/2001 | Wilson et al. | 345/173 |
| 6,373,475 B1 | * | 4/2002 | Challis | 345/174 |
| 6,476,798 B1 | * | 11/2002 | Bertram et al. | 345/174 |
| 6,549,193 B1 | * | 4/2003 | Huang et al. | 345/173 |

* cited by examiner

*Primary Examiner*—Richard Hjerpe
*Assistant Examiner*—Henry N. Tran
(74) *Attorney, Agent, or Firm*—Birch, Stewart, Kolasch & Birch, LLP

(57) ABSTRACT

A touch screen capable of isolating noise signals is mainly a touch screen installing at the front side of a liquid crystal display (LCD) screen or cathode ray tube (CRT) for eliminating electromagnetic and radio frequency interference received by the LCD and CRT. The touch screen includes an antenna like conductive wire which is able to receive same noise signals mixed in the touch control signals. The touch screen controller uses the noise signals received by the antenna wire to offset the noise signals in the controller for increasing accuracy of the touch screen.

9 Claims, 9 Drawing Sheets

TOUCH SCREEN CAPABLE OF ISOLATING NOISE SIGNALS

BACKGROUND OF THE INVENTION

This invention relates to a touch screen that is capable of eliminating noise signals and particularly a touch screen that is capable of eliminating noise signals generated by the background light source of liquid crystal display (LCD) screen or cathode ray tube (CRT), or other external electromagnetic interference (EMI) and radio frequency interference (RFI).

Presently, voltage sensing type touch screen and current sensing type touch screen have been widely used in desk top computers, handheld computers or notebook computers. Users may write, draw pictures or select various functions or press command keys on the screen to generate electric signals and input into the computer to perform processes desired, and do not have to operate the computer through the keyboards.

Aforesaid touch screen (as shown in FIG. 1 for a traditional current sensing type touch screen) usually includes a glass layer 1, a conductive membrane layer 2, a linearization pattern layer 3, an isolation layer 4, a four wire silver printing layer 5 and a tail cable 7 connecting to a controller. The controller outputs four equal voltages to four ends of the linearization pattern of the touch screen to measure current variation.

When different point of the touch screen is touched, the current at the four ends will have different changes. Through measuring the current variation, the controller can determine the touched position. Detailed operation principle may be found in U.S. Pat. No. 4,293,734. In practical operation, the touch screen will absorb ambient noise signals into the four electric current and result in the touch screen cannot accurately respond to the touched position.

There is another type of touch screen (as shown in FIG. 2, a traditional voltage sensing type five wire touch screen) which includes a glass layer 10, an Indium Tin Oxide (ITO) conductive layer 11, a set of insulation points 12, an isolation layer 13, a four wire silver printing layer 14, another isolation layer 15, another ITO conductive layer 16, a plastic membrane layer 17 and a tail cable 18 connecting to a controller. In operating principle, the lower ITO layer links to an even electric field of 0–5V in X-axis direction. When the touch screen is touched, the upper ITO layer contacts the lower ITO layer and measures the voltage value. The voltage value ratio represents the positional ratio on the touch screen in that direction (X-axis). For instance, 3V represents the touch point located at 60% of the total length of the touch screen in the X-direction. When measuring of one direction (i.e. X-axis) is finished, the controller panel converts the upper ITO layer to an even electric field of 0–5V in Y-axis direction, then uses the lower ITO layer to measure the voltage value of touch point at the upper layer and measure the position in another direction (Y-axis). Reference details can be found in U.S. Pat. No. 3,662,105. In practical operation, the touch screen will absorb ambient noise signals into the measured voltage and result in the touch screen not being able to accurately respond to the touched position.

There is yet another type of touch screen (as shown in FIG. 3, a traditional voltage sensing type five wire touch screen) which includes a glass layer 20, an ITO conductive layer 21, a linearization pattern layer 29, a set of insulation points 22, an isolation layer 23, a four wire silver printing layer 24, another isolation layer 25, another ITO conductive layer 26, a plastic membrane layer 27 and a tail cable 28 connecting to a controller. In operating principle, the lower ITO links to an even electric field of 0–5V in X-axis direction. When the touch screen is touched, the upper ITO layer contacts the lower ITO layer and measures the voltage value. The voltage value ratio represents the positional ratio on the touch screen in that direction (X-axis). For instance, 3V represents the touch point is located at 60% of the total length of the touch screen in the X-direction. When measuring of one direction (i.e. X-axis) is finished, the controller panel converts the lower ITO to an even electric field of 0–5V in Y-axis direction, then uses the lower ITO layer to measure the voltage value of touch point at the upper layer and measure the position in another direction (Y-axis). Reference details can be found in U.S. Pat. No. 3,798,370. In practical operation, the touch screen will absorb ambient noise signals into the measured voltage and result in the touch screen not able to accurately respond to the touched position.

Although all the aforesaid traditional touch screens may enable users to operate computers without pressing button keys on the keyboards, they still have a lot of drawbacks when in use. It is because the touch screen is easily affected by the interference resulting from LCD or CRT background light source, or external EMI and RFI, and may cause not accurate sensing position and error in computer judgement or recognition. For instance, drawing a straight line on the touch screen may become a curve when displaying on the screen, or selecting A key on the keyboard map shown on the screen results in a B key displaying on the screen.

SUMMARY OF THE INVENTION

It is therefore an object of this invention to overcome the foregoing disadvantages by adding an antenna-like conductive wire on the touch screen. The conductive wire will receive same noise signals as the ones existed in the touch control signals, and the controller will use the noise signals in the conductive wire to offset the noise signals in the touch control signals for eliminating the noise signals in the control signals thereby to attain the accuracy desired.

BRIEF DESCRIPTION OF THE DRAWINGS

The invention, as well as its many advantages, may be further understood by the following detailed description and drawings.

DESCRIPTION OF THE PREFERRED EMBODIMENTS

Figure 1:
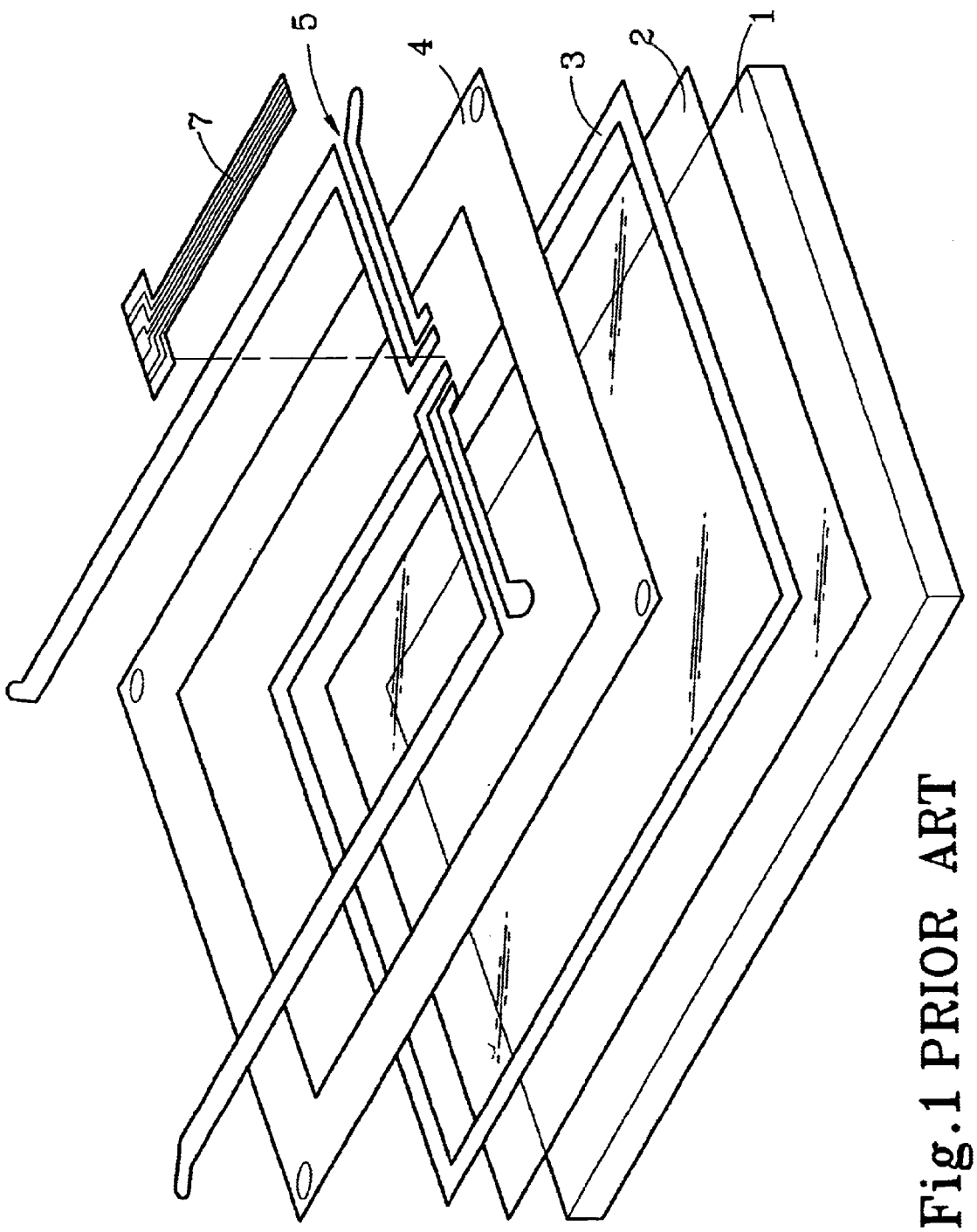
FIG. 1 is a schematic exploded view of a conventional current sensing type touch screen.
Figure 2:
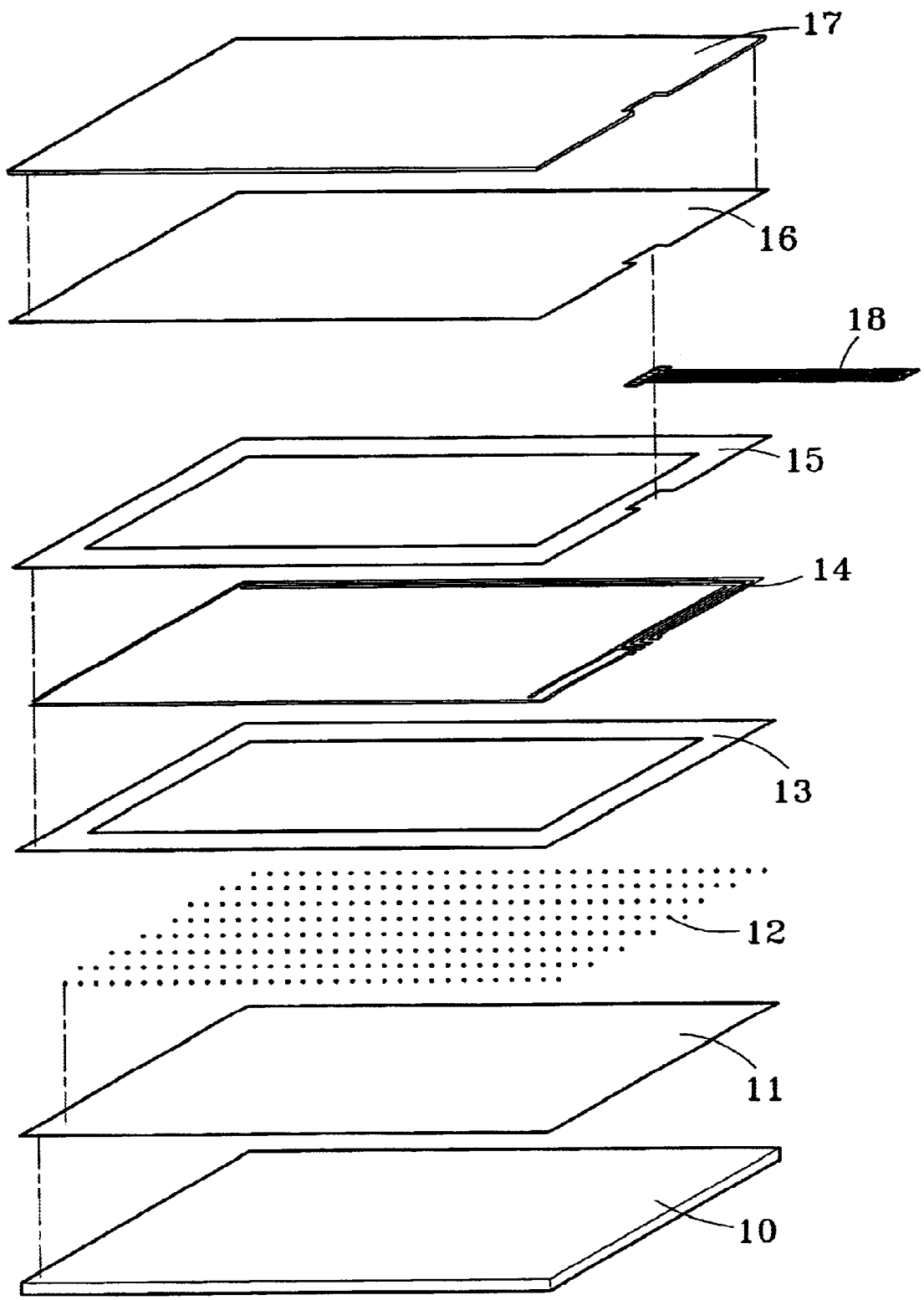
FIG. 2 is a schematic exploded view of a conventional four-wire voltage sensing type touch screen.
Figure 3:
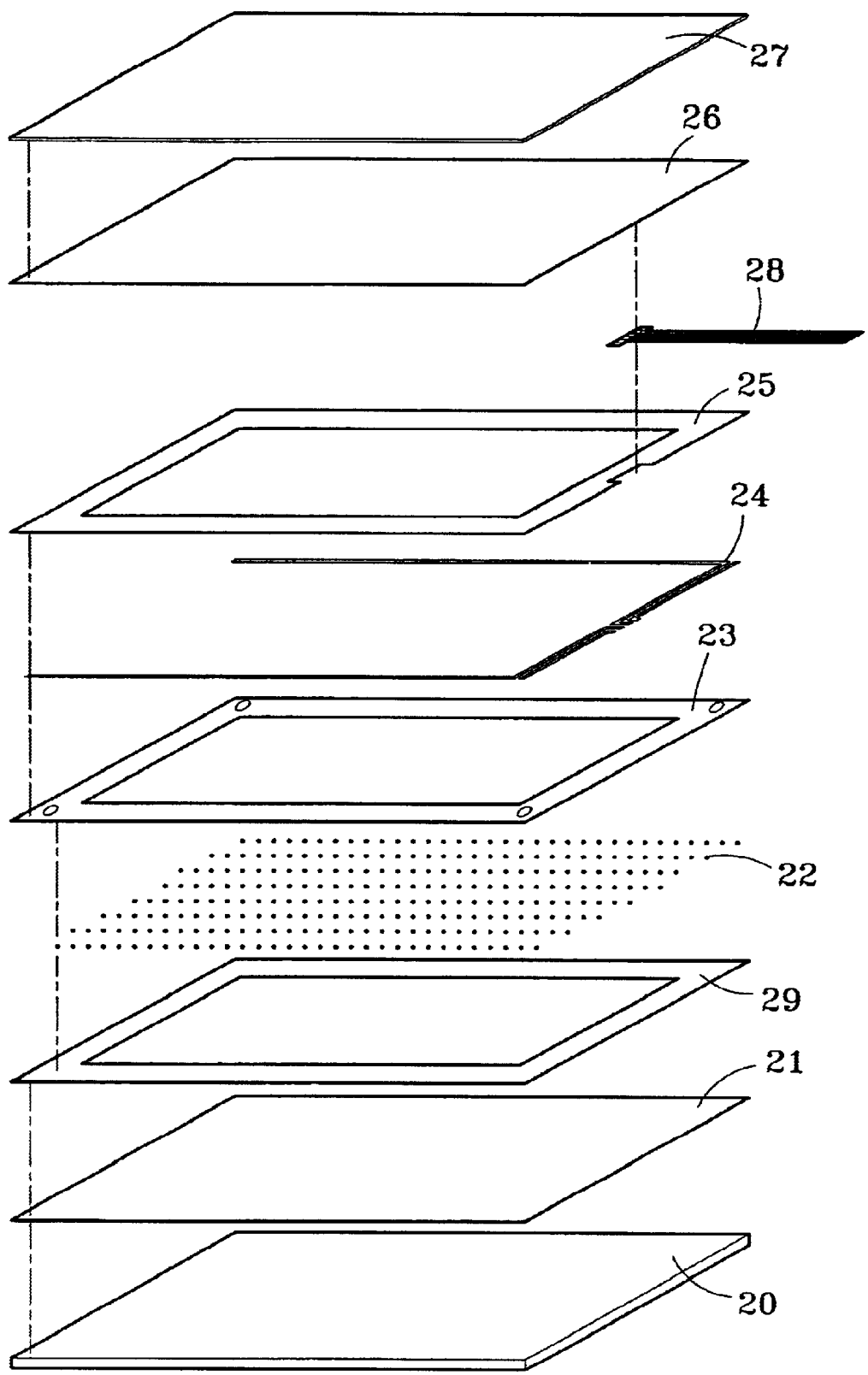
FIG. 3 is a schematic exploded view of a conventional five-wire voltage sensing type touch screen.
Figure 4:
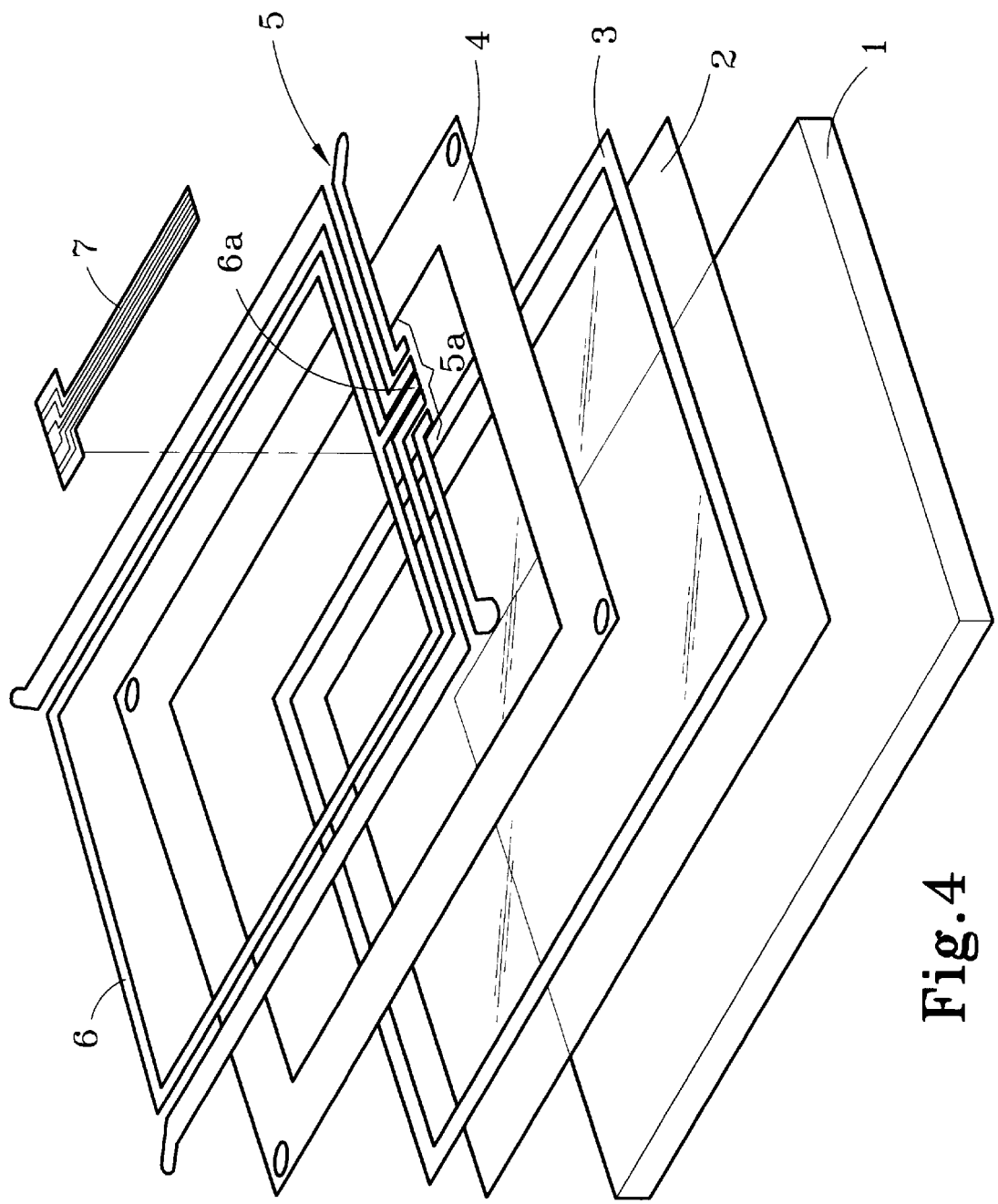
FIG. 4 is a schematic exploded view of the first current sensing type touch screen of this invention.

Referring to FIG. 4 for the first current sensing type touch screen of this invention, it includes printing an additional conductive wire 6 on a traditional current type sensing touch screen. The conductive wire 6 has one end suspending like an antenna. Another end of the conductive wire 6 is connected to a controller of the touch screen. The antenna wire will receive same noise signals as the touch screen does. The controller then uses the received noise signals from the antenna wire to offset noise signals in the touch control signals thereby to enable the current sensing type touch screen becoming a current sensing type touch screen with offset noise signals.

The touch screen set forth above includes a glass layer 1, a conductive membrane layer (ITO) 2, a linearization pattern 3, an isolation layer 4, a five wire silver printing layer 5 and a tail cable 7 connecting to a control panel. The five wire silver printing has one end passing through the tail cable 7 and links to the controller of the touch screen, and another end of four silver printing wires linking to four ends of the linearization pattern. The fifth conductive wire has another end suspended as an antenna wire 6 which is being printed on the isolation layer with the conductive wire of the linearization pattern. Hence there is no additional production cost incurred.

The conductive membrane layer 2 may be Indium Tin Oxide (ITO).

The linearization pattern 3 is being printed at the periphery of the aforesaid conductive membrane layer 2.

The isolation layer 4 is being printed on the aforesaid conductive membrane layer 2.

The four wire silver printing layer 5 and antenna wire 6 are being printed on the isolation layer 4.

The antenna wire 6 is located at the inner or outer side of the four wire silver printing layer 5 with one end extended to offset external noise signal of the touch screen to enable the controller to use this noise signal to offset interference on the touch screen.

The tail cable 7 is a transmission wire made in a membrane fashion for connecting to the connection ends 5a and 6a of the four wire silver printing layer and antenna wire 6 for output the electric signals generated by the touch screen, thereby to form a five wire current sensing type touch screen.

When the aforesaid current sensing type touch screen is connected to a handheld computer, notebook computer or desktop computer for use, the antenna wire 6 will receive noise signals generated by the background light source of the LCD or CRT, or external EMI or RFI, thereby enables the controller to eliminate the interference of same noise signals so that users may write, draw or select various function on the touch screen with reduced interference of external noise signals. Hence there is less distortion happened when users write or draw such as turning straight lines to curves, and the selected position may be accurately located, thereby to prevent output electric signals from causing computer making mistaken judgement or recognition.

Figure 5:
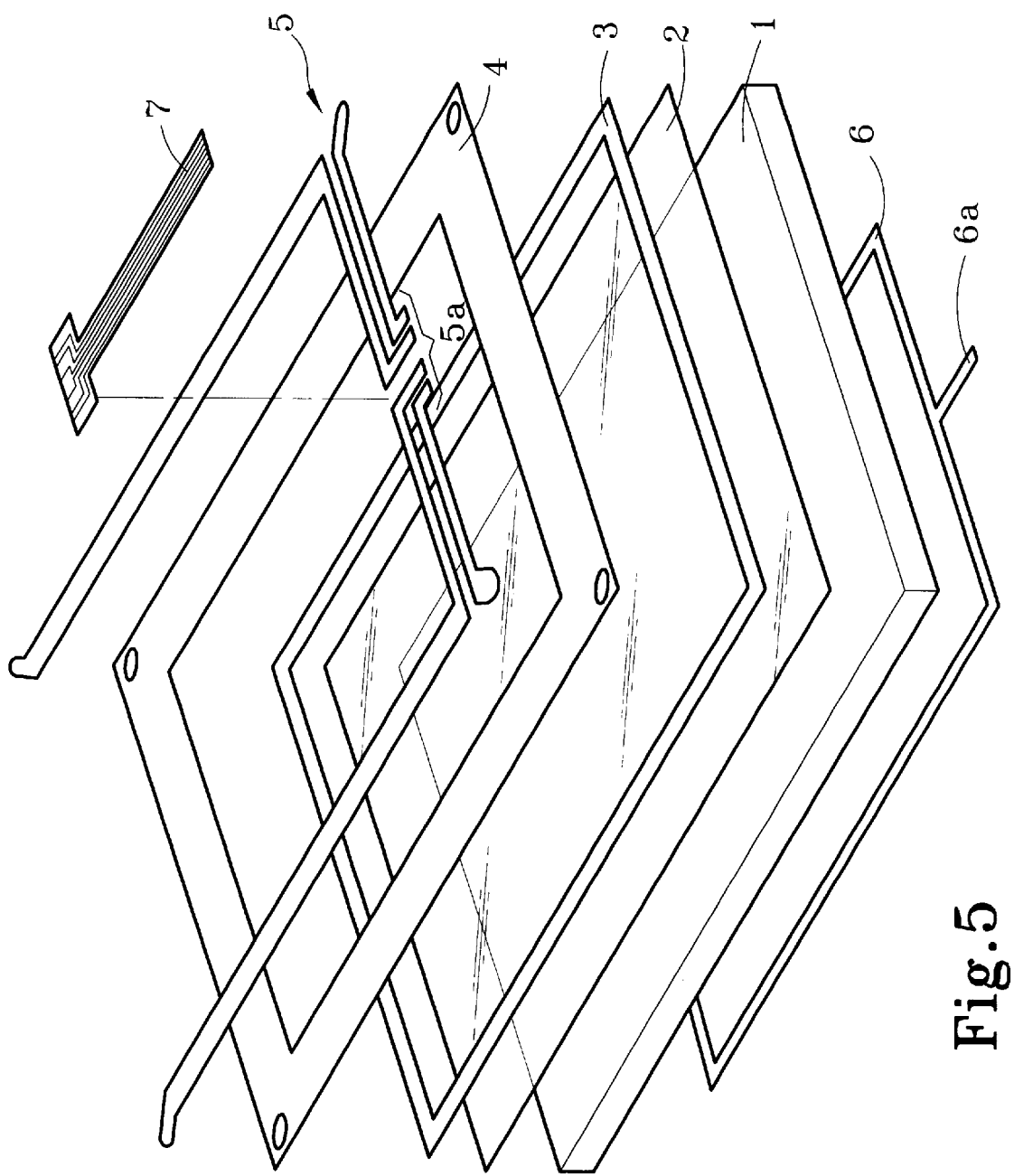
FIG. 5 is a schematic exploded view of the second current sensing type touch screen of this invention.

Referring to FIG. 5 for the second current sensing type touch screen of this invention, it includes printing a layer of additional conductive wire 6 on a rear side of a glass 10 of a traditional current type sensing touch screen. The conductive wire 6 has same function as the one described in FIG. 4 for enabling the current sensing type touch screen becoming a current sensing type touch screen with offset noise signals.

The touch screen set forth above includes a glass layer 1, a conductive membrane layer (ITO) 2, a linearization printing layer 3, an isolation layer 4, a four wire silver printing layer 5, an antenna wire 6 and a tail cable 7. The touch screen uses the same technique described in FIG. 4. The difference is that, the antenna wire 6 is being printed at the periphery of another side of the glass 1. The antenna wire 6 also has the function of offsetting the noise signals from the touch screen depicted in FIG. 4.

The conductive membrane layer 2 may be Indium Tin Oxide (ITO).

The linearization printing layer 3 is being printed at the periphery of the aforesaid conductive membrane layer 2.

The isolation layer 4 is being printed on the aforesaid conductive membrane layer 2.

The four wire silver printing layer 5 is being printed on the isolation layer 4.

The antenna wire 6 is being printed on the rear side of the glass 1 and has one end extended to offset external noise signal of the touch screen to enable the controller to use this noise signal to offset interference on the touch screen.

The tail cable 7 is a transmission wire made in a membrane fashion for connecting to another end of the connection ends 5a and 6a of the four wire silver printing layer 5 and antenna wire 6 for output electric signals generated by the touch screen, thereby to form a five wire current sensing type touch screen.

Figure 6:
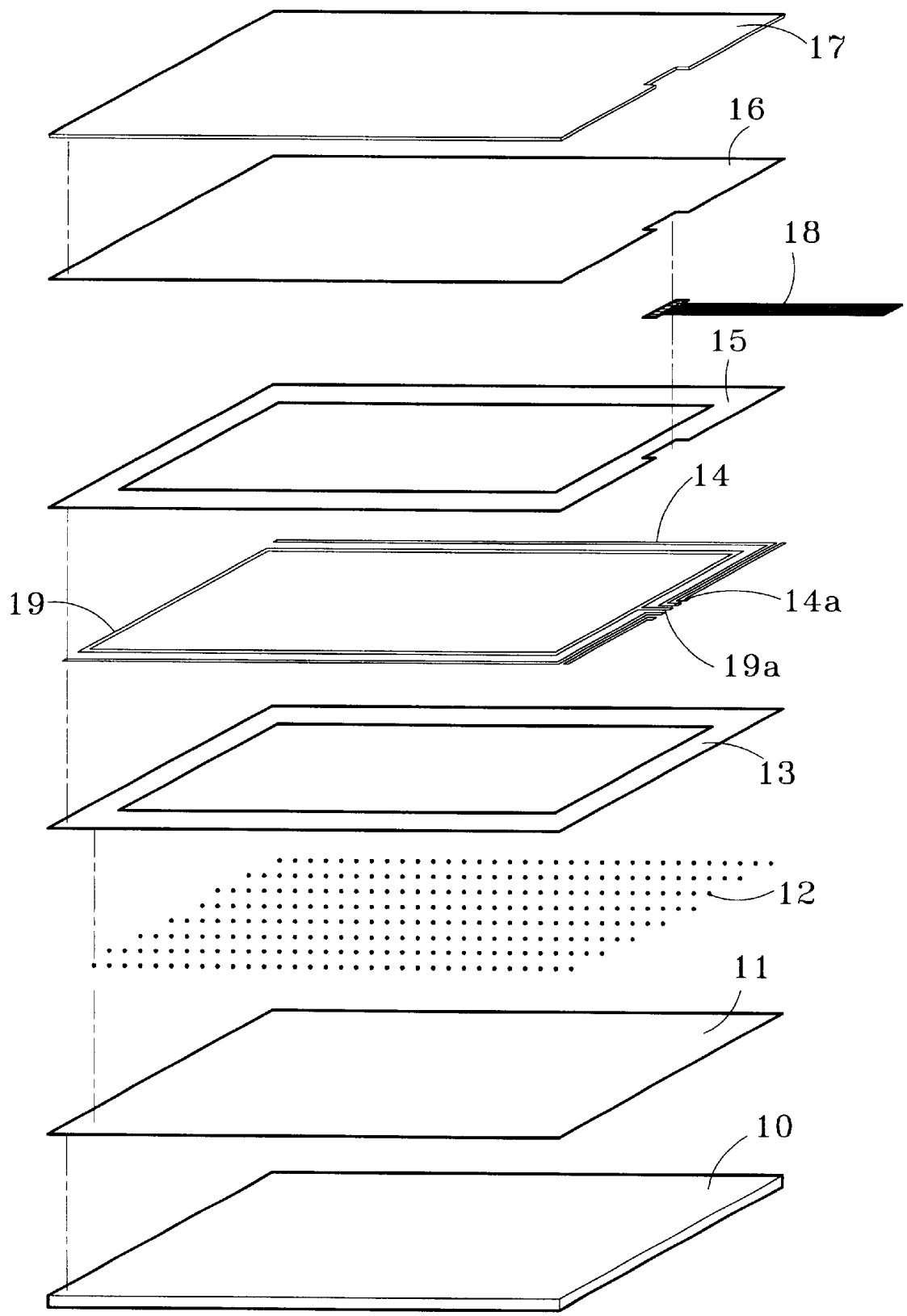
FIG. 6 is a schematic exploded view of the first five-wire voltage sensing type touch screen of this invention.

Referring to FIG. 6, for the first five wire voltage sensing type touch screen of this invention, it includes printing an additional conductive wire 19 on a traditional four wire voltage sensing type touch screen. The conductive wire 19 has one end suspending like an antenna. Another end of the antenna wire is connected to a controller of the touch screen. The antenna wire will receive same noise signals as the touch screen does. The controller uses the received noise signals from the antenna wire to offset noise signals in the touch control signals thereby to enable the four wire voltage sensing type touch screen becoming a five wire voltage sensing type touch screen with offset noise signals.

The touch screen set forth above includes a glass layer 10, a first conductive membrane layer 11, an insulation points layer 12, a first isolation layer 13, a five wire silver printing layer 14, a second isolation layer 15, a second conductive membrane layer 16, a membrane layer 17 and a tail cable 18. The five wire silver printing has one end passing through the tail cable 18. The five silver printing wires have another end passing through the tail cable 18 and connect to the controller of the touch screen. Four silver printing wires have another end connected respectively to two ends of the first and second conductive layer 11 and 16. The fifth conductive wire has another end suspended to become the conductive wire 19 which may be printed on the isolation layer with the conductive wire of the linearization pattern at the same time without incurring additional cost.

The fifth silver printing wire 19 is added to the traditional four wire construction for detecting noise signals. The controller uses the detected noise signals to offset the noise signals in the touch screen.

The first conductive membrane layer 11 may be an Indium Tin Oxide (ITO).

The insulation points layer 12 is being printed or adhered to the first conductive membrane layer 11.

The first isolation layer 13 is being printed at the periphery of the insulation points layer 12.

The five wire silver printing layer 14 is formed by printing five wires to connect the controller wire set at the first isolation layer 13.

The second conductive membrane layer 16 may be an ITO.

The membrane layer 17 is a transparent membrane.

The tail cable 18 is transmission wire made in a membrane fashion for connecting to the connector ends 14a and 19a of the five wire silver printing layer 14 and conductive wire 19 for output electric signals generated by the touch screen.

When the aforesaid touch screen is connected to a handheld computer, notebook computer or desktop computer for use, the conductive wire 19 on the touch screen will offset the noise signals generated by the background light source of the LCD or CRT, or external EMI or RFI, thereby enables users to write, draw or select various function on the touch screen with no noise signal interference such as straight lines turning to curves, and the selecting position may be accurately located, thereby to prevent output electric signals from causing computer to make mistaken judgement or recognition.

Figure 7:
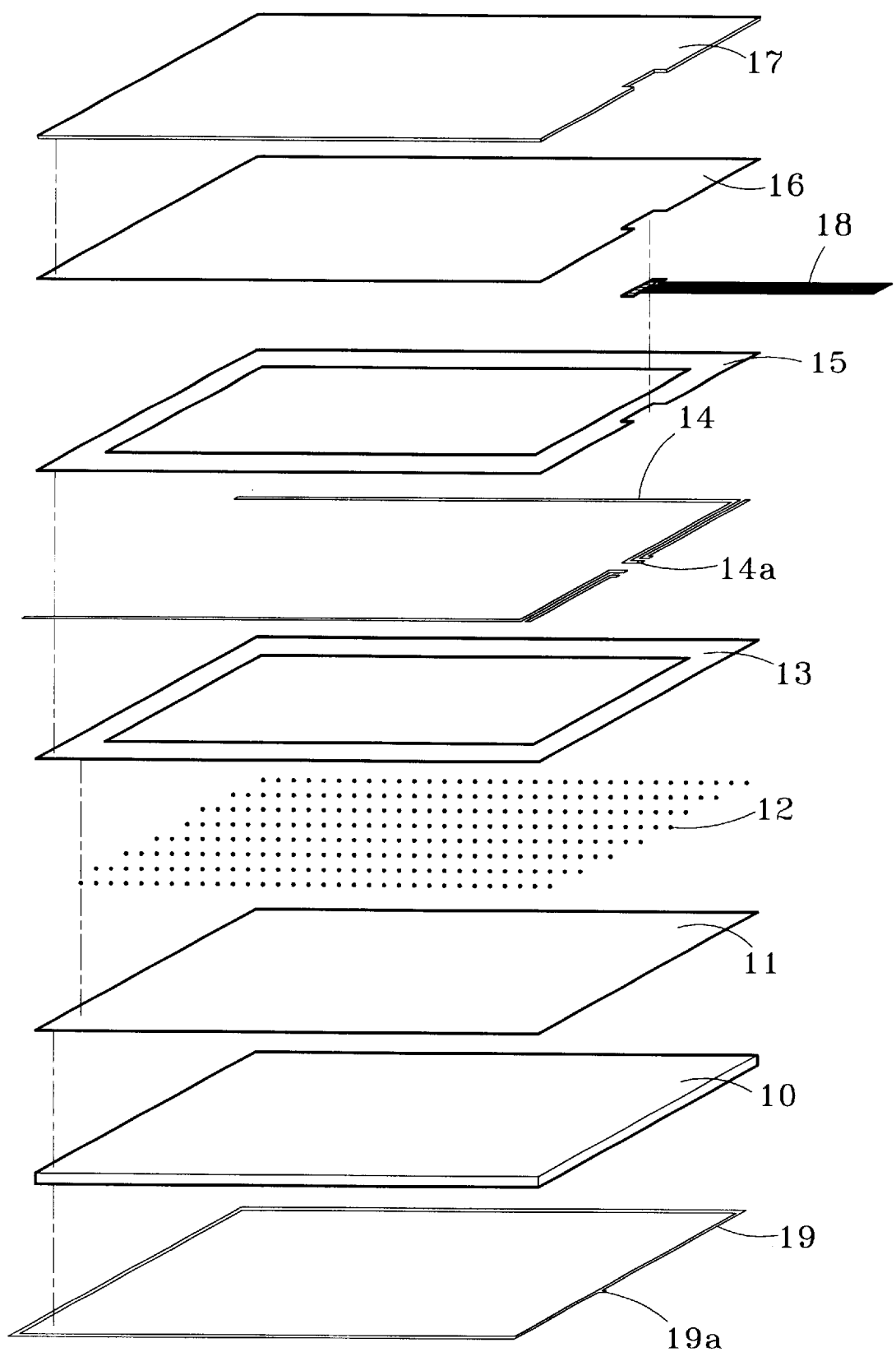
FIG. 7 is a schematic exploded view of the second five-wire voltage sensing type touch screen of this invention.

Referring to FIG. 7 for the second five wire voltage sensing type touch screen of this invention, it includes printing an additional conductive wire 19 on the rear side of the touch screen of a traditional four wire voltage type sensing touch screen to become a five wire voltage sensing type touch screen with offset noise signals.

The touch screen set forth above includes a glass layer 10, a first conductive membrane layer 11, an insulation points layer 12, a first isolation layer 13, a four wire silver printing layer 14, a second isolation layer 15, a conductive wire 19, a membrane layer 17, a second conductive membrane layer 16, and a tail cable 18. The conductive wire 19 is added to the traditional four wire construction for detecting noise signals. The controller uses the detected noise signals to offset the noise signals in the touch screen.

The conductive wire 19 is being printed on the rear side of the glass layer 10 for linking to the fifth wire of the tail cable.

The first conductive membrane layer 11 may be Indium Tin Oxide (ITO).

The insulation points layer 12 is being printed or adhered to the first conductive membrane layer 11.

The first isolation layer 13 is being printed at the periphery of the insulation points layer 12.

The five wire silver printing layer 14 is formed by printing five wires to connect the controller wire set at the first isolation layer 13. The wire set has a connection end 14a located at one end thereof to output signal.

The membrane layer 17 is a transparent membrane.

The second conductive membrane layer 16 may be ITO.

The tail cable 18 is a transmission wire made in a membrane fashion for connecting to the connection ends 14a and 19a of the five wire silver printing layer 14 and conductive wire 19 for output electric signals generated by the touch screen.

The touch screen thus made becomes another five wire type touch screen with offset noise signals.

When the aforesaid touch screen is connected to a handheld computer, notebook computer or desktop computer for use, the conductive wire 19 on the touch screen will offset noise signals generated by the background light source of the LCD or CRT, or external EMI or RFI, thereby enables users to write, draw or select various function on the touch screen with no noise signals interference such as straight lines turning to curves, and the selecting position may be accurately located, thereby to prevent output electric signals from causing computer to make mistaken judgement or recognition.

Figure 8:
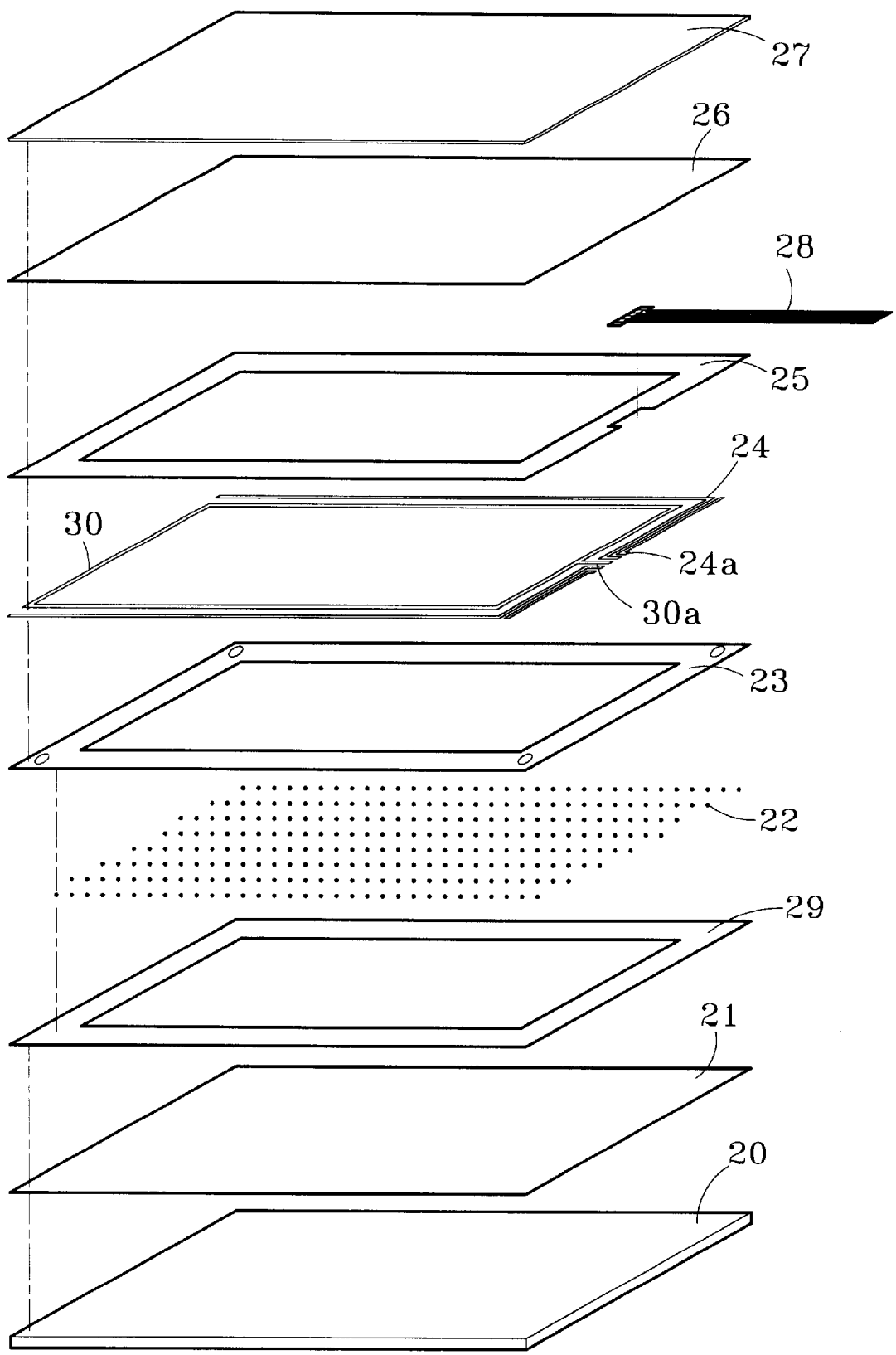
FIG. 8 is a schematic exploded view of the first six-wire voltage sensing type touch screen of this invention.

Referring to FIG. 8 for the first six wire voltage sensing type touch screen of this invention, it includes printing an additional conductive wire 30 on a traditional five wire voltage type sensing touch screen. The antenna wire 30 enables the five wire voltage sensing type touch screen to become a six wire voltage sensing type touch screen with offset noise signals.

The touch screen set forth above includes a glass layer 20, a first conductive membrane layer 21, an insulation points layer 22, a first isolation layer 23, a linearization pattern layer 29, a five wire silver printing layer 24, a second isolation layer 25, a second conductive membrane layer 26, a membrane layer 27, and a tail cable 28. The conductive wire (the sixth wire) 30 is added to the traditional five wire construction for detecting noise signals. The controller uses the detected noise signals to offset the noise signals in the touch screen.

The first conductive membrane layer 21 may be Indium Tin Oxide (ITO).

The insulation points layer 22 is being printed or adhered to the first conductive membrane layer 21.

The first isolation layer 23 is being printed at the periphery of the insulation points layer 22.

The five wire silver printing layer 24 is formed by printing six wires to connect the controller wire set at the first isolation layer 23. The wire set has a connection end 24a located at one end thereof to output signals.

The membrane layer 27 is a transparent membrane.

The second conductive membrane layer 26 may be an ITO.

The tail cable 28 is transmission wire made in a membrane fashion for connecting to aforesaid connection ends 24a and 30a to output electric signals generated by the touch screen.

The touch screen thus made becomes a six wire type touch screen with offset noise signals.

When the aforesaid touch screen is connected to a handheld computer, notebook computer or desktop computer for use, the conductive wire 30 on the touch screen will offset noise signals generated by the background light source of the LCD or CRT, or external EMI or RFI, thereby enables users to write, draw or select various function on the touch screen with no noise signals interference such as straight lines turning to curves, and the selecting position may be accurately located, thereby to prevent output electric signals from causing computer to make mistaken judgement or recognition.

Figure 9:
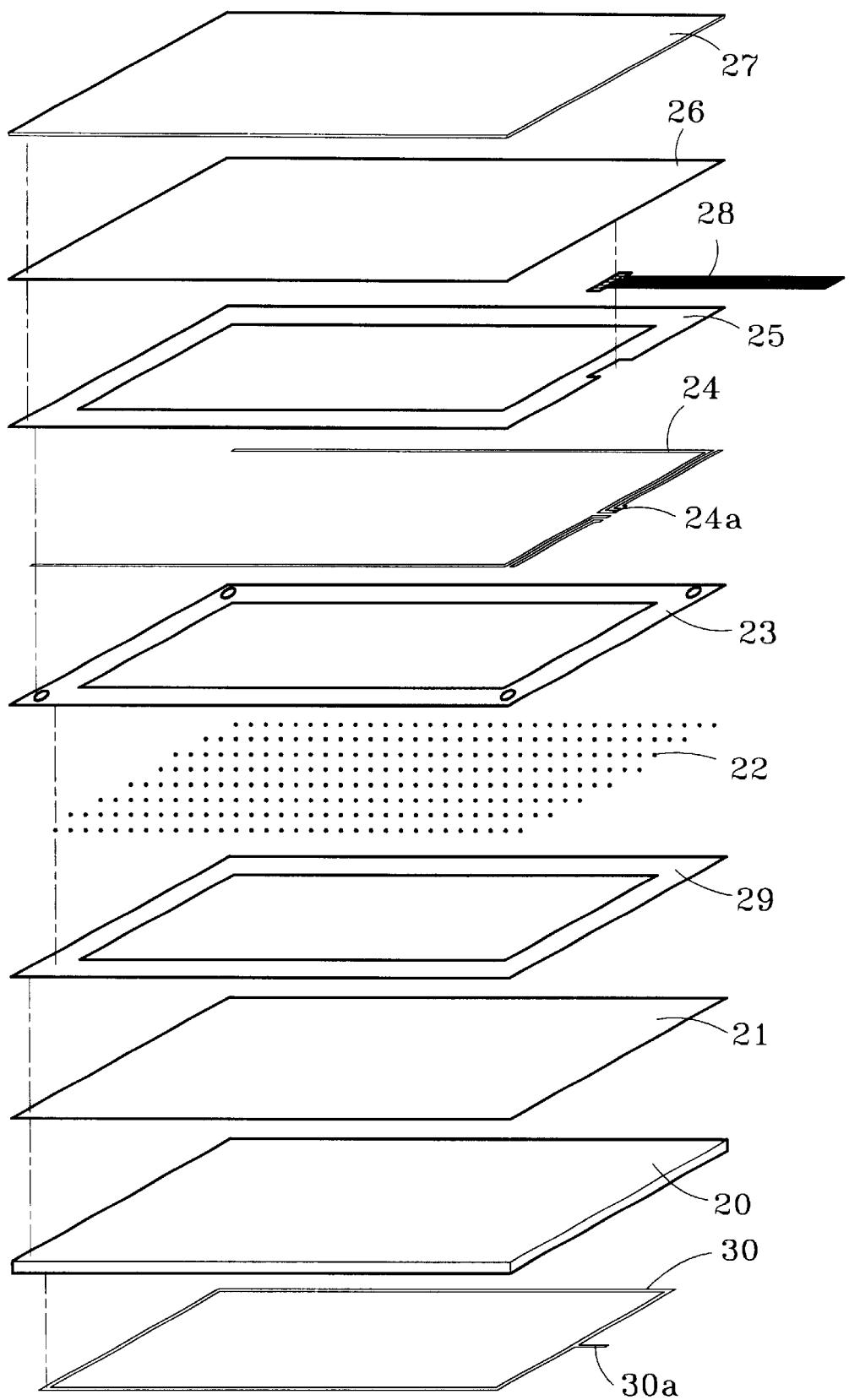
FIG. 9 is a schematic exploded view of the second six-wire voltage sensing type touch screen of this invention.

Referring to FIG. 9 for the second six wire voltage sensing type touch screen of this invention, it includes printing an additional conductive wire 30 on a rear side of the glass of a traditional five wire voltage type sensing touch screen. The conductive wire 30 enables the five-wire voltage sensing type touch screen to become a six wire voltage sensing type touch screen with offset noise signals.

The touch screen set forth above includes a glass layer 20, a conductive wire 30, a first conductive membrane layer 21, an insulation points layer 22, a first isolation layer 23, a linearization pattern layer 29, a five wire silver printing layer 24, a membrane layer 27, a second conductive membrane layer 26, and a tail cable 28. The conductive wire 30 is added to the traditional five-wire construction for detecting noise signals. The controller uses the detected noise signals to offset the noise signals in the touch screen.

The conductive membrane layer 21 is being printed on the rear side of the glass layer 20 for linking to the sixth wire of the tail cable 28.

The first conductive membrane layer 21 may be an Indium Tin Oxide (ITO).

The insulation points layer 22 is being printed or adhered to the first conductive membrane layer 21.

The first isolation layer 23 is being printed at the periphery of the insulation points layer 22.

The five wire silver printing layer 24 is formed by printing five wires to connect the controller wire set at the first isolation layer 23.

The membrane layer 27 is a transparent membrane.

The second conductive membrane layer 26 may be an ITO.

The tail cable 28 is a transmission wire made in a membrane fashion for connecting to the connection ends 24a and 30a of the five wire silver printing layer 24 and conductive wire 30 to output electric signals generated by the touch screen.

The touch screen thus made becomes a six wire type touch screen with offset noise signals.

When the aforesaid touch screen is connected to a handheld computer, notebook computer or desktop computer for use, the conductive wire 30 on the touch screen will offset noise signals generated by the background light source of the LCD or CRT, or external EMI or RFI, thereby enables users to write, draw or select various function on the touch screen with no noise signals interference such as straight lines turning to curves, and the selecting position may be accurately located, thereby to prevent output electric signals from causing computer to make mistaken judgement or recognition.

What is claimed is:

1. A current sensing type touch screen capable of eliminating noise signals, comprising a glass layer, a conductive membrane layer, a linearization pattern layer, an isolation layer, a five wire silver printing layer and a tail cable; wherein:

four conductive wires are connected to four ends of the linearization pattern layer and another four ends are connected to a-controller, the fifth conductive wire having one end suspended and another end linked to the controller;

the four conductive wires are printed on one side of the glass layer and the fifth conductive wire is printed on another side of the glass layer; and the fifth conductive wire detects noise signals which affect the controller, and the controller uses the noise signals conductive wire to eliminate interference caused by the noise signals in the controller thereby forming a five wire current sensing type touch screen with offset noise signals.

2. The touch screen of claim 1, wherein the conductive wire has a connection end.

3. The touch screen of claim 1, wherein the conductive wire is printed as rectangular border lines.

4. A five wire voltage sensing type touch screen capable of eliminating noise signals, comprising a glass layer, a first conductive membrane layer, an insulation points layer, a first isolation layer, a five wire silver printing layer, a second isolation layer, a second conductive membrane layer, and an additional membrane layer; wherein:

four conductive wires are connected to four respective ends of the first and second conductive membrane layers and another four ends are connected to a controller the fifth conductive wire having one end suspended and another end linked to the controller;

the four conductive wires are printed on one side of the glass layer and the fifth conductive wire is printed on another side of the glass layer; and the fifth conductive wire detects noise signals which affect the controller, and the controller uses the noise signals detected by the fifth conductive wire to eliminate interference caused by the noise signals in the controller, thereby forming a five wire voltage sensing type touch screen with offset noise signals.

5. The touch screen of claim 4, wherein the conductive wire has a connection end.

6. The touch screen of claim 4, wherein the conductive wire is printed on another side of the glass layer.

7. A six wire voltage sensing type touch screen capable of eliminating noise signals, comprising a glass layer, a first conductive membrane layer, a linearization pattern layer, an insulation points layer, a first isolation layer, a five wire silver printing layer, a second isolation layer, a second conductive membrane layer, and an additional membrane layer; wherein:

five conductive wires are connected to five ends of the linearization pattern layer and another five ends are connected to a controller, the sixth conductive wire having one end suspended and another end linked to the controller;

the five conductive wires are printed on one side of the glass layer and the sixth conductive wire is printed on another side of the glass layer; and the sixth conductive wire detects noise signals which affect the controller, and the controller uses the noise signals detected by the sixth conductive wire to eliminate interference caused by the noise signals in the controller, thereby forming a six wire voltage sensing type touch screen with offset noise signals.

8. The touch screen of claim 7, wherein the conductive wire has a connection end.

9. The touch screen of claim 7, wherein the conductive wire is printed as rectangular border lines.

* * * * *